United States Patent
Gupta et al.

(10) Patent No.: US 11,508,348 B2
(45) Date of Patent: Nov. 22, 2022

(54) DIRECTIONAL NOISE SUPPRESSION

(71) Applicant: Motorola Mobility LLC, Chicago, IL (US)

(72) Inventors: Malay Gupta, South Elgin, IL (US); Joel Clark, Woodridge, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/783,059

(22) Filed: Feb. 5, 2020

(65) Prior Publication Data

US 2021/0241744 A1 Aug. 5, 2021

(51) Int. Cl.
*H04R 3/00* (2006.01)
*H04R 1/40* (2006.01)
*G10L 17/00* (2013.01)
*G10K 11/175* (2006.01)

(52) U.S. Cl.
CPC ............ *G10K 11/175* (2013.01); *G10L 17/00* (2013.01); *H04R 1/406* (2013.01); *H04R 3/005* (2013.01)

(58) Field of Classification Search
CPC .............. G10K 11/175; G10L 17/00; G10L 2021/02166; G10L 21/028; G10L 2015/223; H04R 1/406; H04R 3/005; H04R 2430/20; H04R 2430/25
See application file for complete search history.

(56) References Cited

U.S. PATENT DOCUMENTS

| | | | |
|---|---|---|---|
| 10,755,727 B1* | 8/2020 | Chu | H04R 1/406 |
| 2008/0232607 A1* | 9/2008 | Tashev | G01S 3/86 |
| | | | 381/71.11 |
| 2011/0038489 A1* | 2/2011 | Visser | G01S 3/8006 |
| | | | 381/92 |
| 2013/0304476 A1* | 11/2013 | Kim | G10L 21/00 |
| | | | 704/270 |
| 2014/0098964 A1* | 4/2014 | Rosca | H04R 3/005 |
| | | | 381/56 |
| 2014/0314251 A1* | 10/2014 | Rosca | H04R 1/406 |
| | | | 381/92 |

(Continued)

OTHER PUBLICATIONS

Erdogan, et al., "Improved MVDR beamforming using single-channel mask prediction networks", Published Sep. 2016; Viewed online on May 11, 2021 at https://www.merl.com/publications/docs/TR2016-072.pdf.

(Continued)

*Primary Examiner* — Daniel R Sellers (57) ABSTRACT

Systems and methods of providing improved directional noise suppression in an electronic device implement a technique that specifies a direction or speaker of interest, determines the directions corresponding to speakers not lying in the direction of interest, beam forms the reception pattern of the device microphone array to focus in the direction of interest and suppresses signals from the other directions, creating beam formed reception data. A spatial mask is generated as a function of direction relative to the direction of interest. The spatial mask emphasizes audio reception in the direction of interest and attenuates audio reception in the other directions. The beam formed reception data is then multiplied by the spatial mask to generate an audio signal with directional noise suppression.

20 Claims, 7 Drawing Sheets

(56) References Cited

U.S. PATENT DOCUMENTS

2014/0350926 A1* 11/2014 Schuster ................. G10L 15/26
704/233
2017/0164102 A1* 6/2017 Ivanov ................... H04R 3/005

OTHER PUBLICATIONS

Tashev, et al., "Microphone Array Post-Processor Using Instantaneous Direction of Arrival", Published Sep. 12, 2006; Proceedings of International Workshop on Acoustic, Echo and Noise Control; https://www.microsoft.com/en-us/research/wp-content/uploads/2016/02/Tashev_IWAENC_2006_Spatial_Filter.pdf.

* cited by examiner

DIRECTIONAL NOISE SUPPRESSION

TECHNICAL FIELD

The present disclosure is related generally to electronic communications devices and, more particularly, to systems and methods for providing efficient directional noise suppression with respect to such devices.

BACKGROUND

Microphone array beamforming has traditionally been used for directional noise suppression and signal enhancement. However, sub-optimal placement of microphones forming the array contributes to grating lobes in the resulting beam pattern, compromising the array directionality and restricting operating frequency bandwidth. Moreover, both the number of microphones comprising the array and their ideal placement on consumer devices is generally dependent on industrial design constraints.

Before proceeding to the remainder of this disclosure, it should be appreciated that the disclosure may address some or all of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a detailed discussion of embodiments of the disclosed principles, an overview of certain embodiments is given to aid the reader in understanding the later discussion. As noted above microphone array beamforming has traditionally been used for directional noise suppression and signal enhancement. However, sub-optimal placement of microphones forming the array contributes to grating lobes in the resulting beam pattern, compromising the array directionality and restricting operating frequency bandwidth. Since ideal placement of microphone arrays on consumer devices is generally not possible due to industrial design constraints, this problem has heretofore remained unsolved.

In embodiments of the disclosed principles, efficient and robust digital signal processing (DSP) techniques are provided that directly improve directional noise suppression (DNS). An example system usable within various embodiments includes a microphone array front-end followed by an intelligent acoustic source localization sub-system equipped with the ability to distinguish between a desired source and an interfering source or sources via machine learning driven speaker identification. Once the desired source and the interfering sources (e.g., other users) are localized, the DNS system suppresses the acoustic signals impinging on the microphone array from the directions corresponding to the interfering users while preserving the signal coming from the desired source direction.

The disclosed system may be implemented in various configurations. One example configuration has the ability to be used as a stand-alone solution replacing the traditional beamforming by a "spatial mask", while in another example configuration, the disclosed DNS is a two stage directional noise suppression system in which a traditional fixed or adaptive/steerable beamforming system is cascaded with the aforementioned spatial mask to improve the resulting beam pattern of the microphone array. The improved beam pattern of the microphone array can be quantified in terms of how narrow the beam is, or how low the side lobes are in stop-band, or in terms of the transition between the pass-band and the stop-band of the beam pattern. The disclosed principles provide flexibility in designing the array beam-pattern with respect to pass-band width, the transition region and the stop-band attenuation.

With this overview in mind, and turning now to a more detailed discussion in conjunction with the attached figures, the techniques of the present disclosure are illustrated as being implemented in or via a suitable device environment. The following device description is based on embodiments and examples within which or via which the disclosed principles may be implemented, and should not be taken as limiting the claims with regard to alternative embodiments that are not explicitly described herein.

Figure 1:
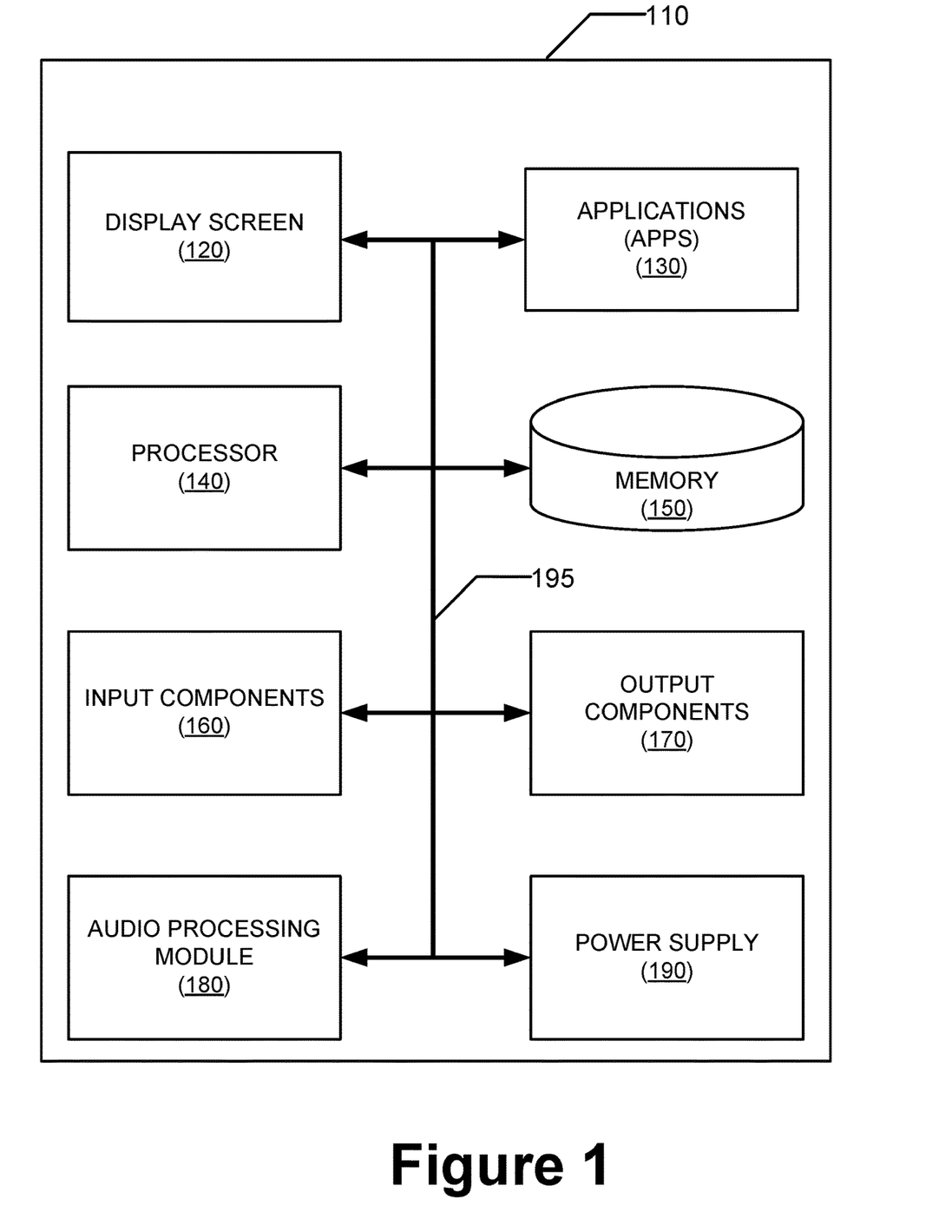
FIG. 1 is a general schematic representation of a mobile electronic device in which various embodiments of the disclosed principles may be implemented.

Thus, for example, while FIG. 1 illustrates an example mobile electronic communications device with respect to which embodiments of the disclosed principles may be implemented, it will be appreciated that other device types may be used, including but not limited to smart phones, intelligent voice assistants, laptop computers, tablet computers, and so on. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as RF input facilities or wired input facilities, including, for example one or more antennas and associated circuitry and logic. The antennas and associated circuitry may support any number of protocols, e.g., WiFi, Bluetooth, cellular, etc.

The device 110 as illustrated also includes one or more output components 170 such as RF (radio frequency) or wired output facilities. The RF output facilities may similarly support any number of protocols, e.g., WiFi, Bluetooth, cellular, etc., and may be the same as or overlapping with the associated input facilities. It will be appreciated that a single physical input may serve for both transmission and receipt.

The processor 140 can be a microprocessor, microcomputer, application-specific integrated circuit, or other suitable integrated circuit. For example, the processor 140 can be implemented via one or more microprocessors or controllers from any desired family or manufacturer. Similarly, the memory 150 is a nontransitory media that may (but need not) reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read-only memory (i.e., a hard drive, flash memory or any other desired type of memory device).

The information that is stored by the memory 150 can include program code (e.g., applications 130) associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications and modules, these typically utilize the operating system to provide more specific functionality, such as file system service and handling of protected and unprotected data stored in the memory 150. In an embodiment, modules are software agents that include or interact with hardware components such as one or more sensors, and that manage the device 110's operations and interactions with respect to the described embodiments. An audio processing module 180 is shown and may be used to implement some or all of the audio processing operations described herein.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

In an embodiment, a power supply 190, such as a battery or fuel cell, is included for providing power to the device 110 and its components. Additionally or alternatively, the device 110 may be externally powered, e.g., by a vehicle battery, wall socket or other power source. In the illustrated example, all or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications). As noted above, the device 110 may include one or more display screens 120. These may include one or both of an integrated display and an external display.

In an embodiment, a portable always-on voice recognition system is implemented within a device, such as that of FIG. 1 or otherwise. When the device is placed on a flat surface, the voice recognition system estimates the distance and direction-of-arrival (DOA) of sound sources around it, identifies a desired user, spatially tracks the desired user, and rejects/suppresses any sound coming from non-desired directions.

Figure 2:
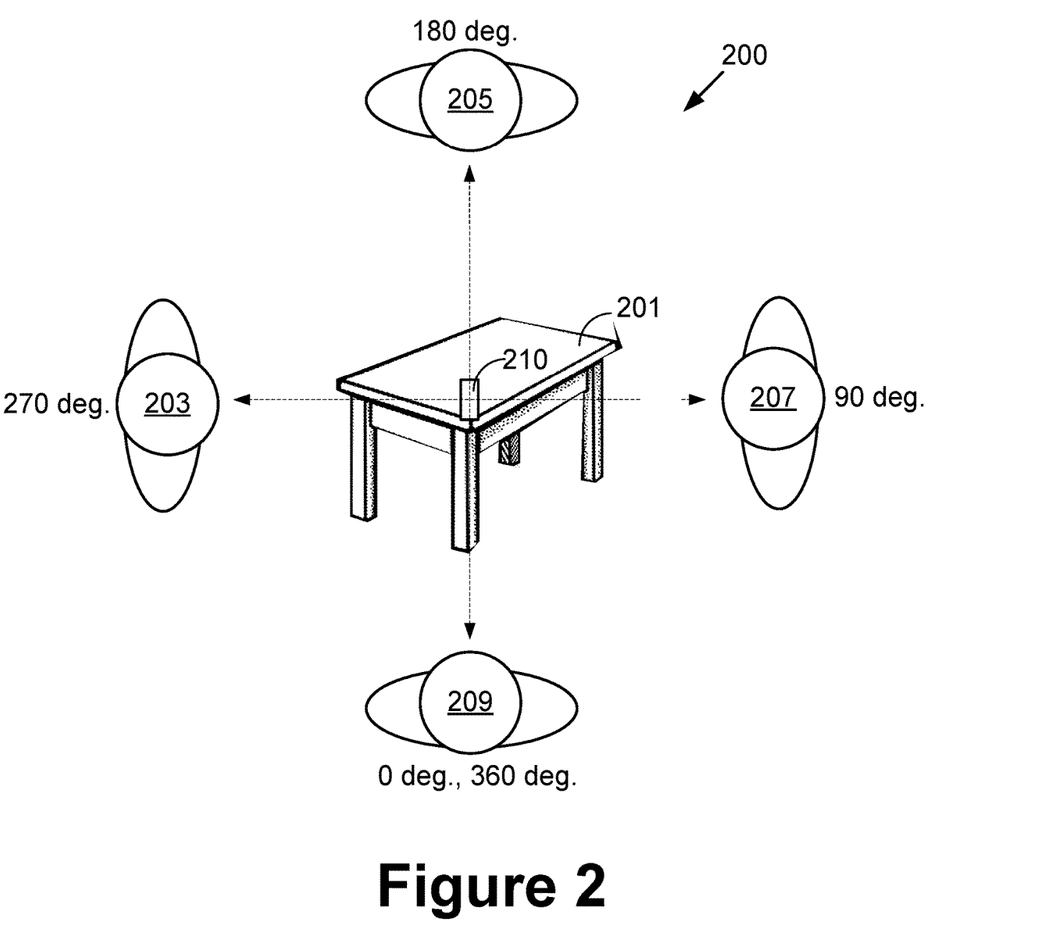
FIG. 2 is a schematic example usage environment within which embodiments of the disclosed principles may be implemented.

FIG. 2 is a simplified perspective view of an environment 200 within which such a device 210 is being used. As can be seen, the device 210 rests flat on a table 201. The table 201 is bordered by four users 203, 205, 207 and 209, located in this example at respective positions of 270°, 180°, 90°, and 0°/360°. In such a situation, the device 210, when used to respond to or pick up a particular user's voice, e.g., during a conference call, is able to locate and isolate the particular user's voice using the described directional noise suppression technique and system. It will be appreciated that there need not be four users, but there may be a greater or lesser number of users. Moreover, whatever users are present in the environment 200 need not be located in any of the precise locations shown.

The quality of the recognition rate provided by a voice recognition system is typically conveyed via a "False Reject" (FR) rate and a "False Accept" (FA) rate. High rates of either type or undesirable, and improvement is shown by reducing either, although in some situation one type of false decision may be preferred over the other type.

A FR event occurs for example when the desired user utters a word or phrase, e.g., a correct trigger word, but is not recognized by the voice recognition device. Likewise, a FA occurs when someone other than the desired user provides the utterance in question (or the desired user provides an incorrect utterance) but the voice recognition device nonetheless registers the utterance as a trigger word and activates associated signal processing blocks. Both FA and FR can be annoying to the end user and have an adverse impact on user experience and may increase the power consumption of the voice recognition device.

In the case of a portable device such as device 110 (210), increased power consumption leads to faster battery decay. Therefore, better FR and FA rates will generally provide a better end user experience and will extend device battery life. As will be seen later herein, the disclosed system allows flexibility to improve upon FR and FA individually or jointly.

In various embodiments, the disclosed directional noise suppression system improves the recognition accuracy of an automatic speech recognition (ASR) engine in the presence of non-stationary noise (speech-like noise). Non-stationary noise generally degrades the recognition rate of ASR engines significantly.

Figure 3:
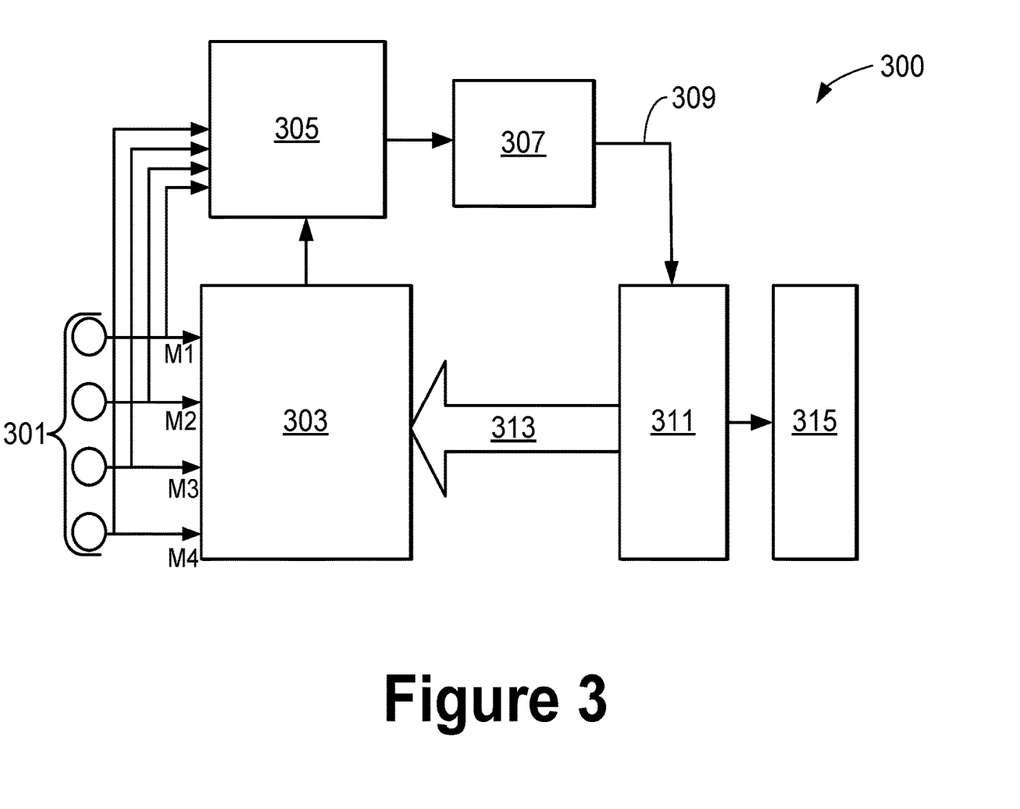
FIG. 3 is a modular diagram showing the audio processing architecture in accordance with an embodiment of the disclosed principles.

As depicted in FIG. 3, a microphone array 301 is used to acquire multichannel speech/audio signals M1, M2, M3 and M4, which are subsequently processed to reduce directional and ambient noise. An example geometry of the microphone array is depicted in FIG. 3; however, the microphone array 301 need not be constrained to the depicted shape (i.e., linear). The array 301 geometry can vary depending on the use case and form-factor of the device on which the microphone array 301 is implemented, and can take any arbitrary shape.

In FIG. 3, a four microphone system is shown only for illustrative purposes, and it will be appreciated that both the number of microphones and the array geometry may vary depending on form-factor and use case without departing from the disclosed principles. Once the multichannel signals Mn are acquired, the signals are processed by a series of DSP sub-modules. These sub-modules include an Acoustic Source Direction and Range Estimator (localizer) 303, which localizes the acoustic sources and the speaker ID system 311 determines whether each localized source is the desired source or not.

The localizer 303 then sends the locations of the desired source and the interfering sources to the directional noise reducer 305. The directional noise reducer 305 suppresses the interfering directional noise and passes the signal then to the ambient noise reducer 307, which suppresses stationary ambient noise to produce a noise reduced signal 309.

The noise reduced signal 309 is fed to a speaker ID module 311 which provides a confidence score indicating the presence or absence of the desired speaker/user. Based on the information received from the speaker ID module 311, a decision is made whether to update the desired source direction (Ds) (also referred to as the "direction of interest") or not. If it is determined by the speaker ID module 311 that the active user is not the desired source, then the estimated source direction is considered to be an interfering source direction ($D_i$).

After processing all detected acoustic sources, the desired source direction and interfering source directions are known, and this information is fed back to the localizer 303 via the data signal 313, and hence to the directional noise reducer 305. The directional noise reducer 305 then computes an attenuation to be applied to the primary (desired) microphone signal (or the beam formed signal) to further attenuate interfering sound sources. Beam forming is known and comprises, for example, improving reception in one or more directions through phase manipulations. Once the desired speech signal is produced with suppression of directional and ambient interfering noise, the signal is provided to an automatic speech recognition engine 315 for possible recognition and appropriate subsequent actions if recognition occurs.

Figure 4:
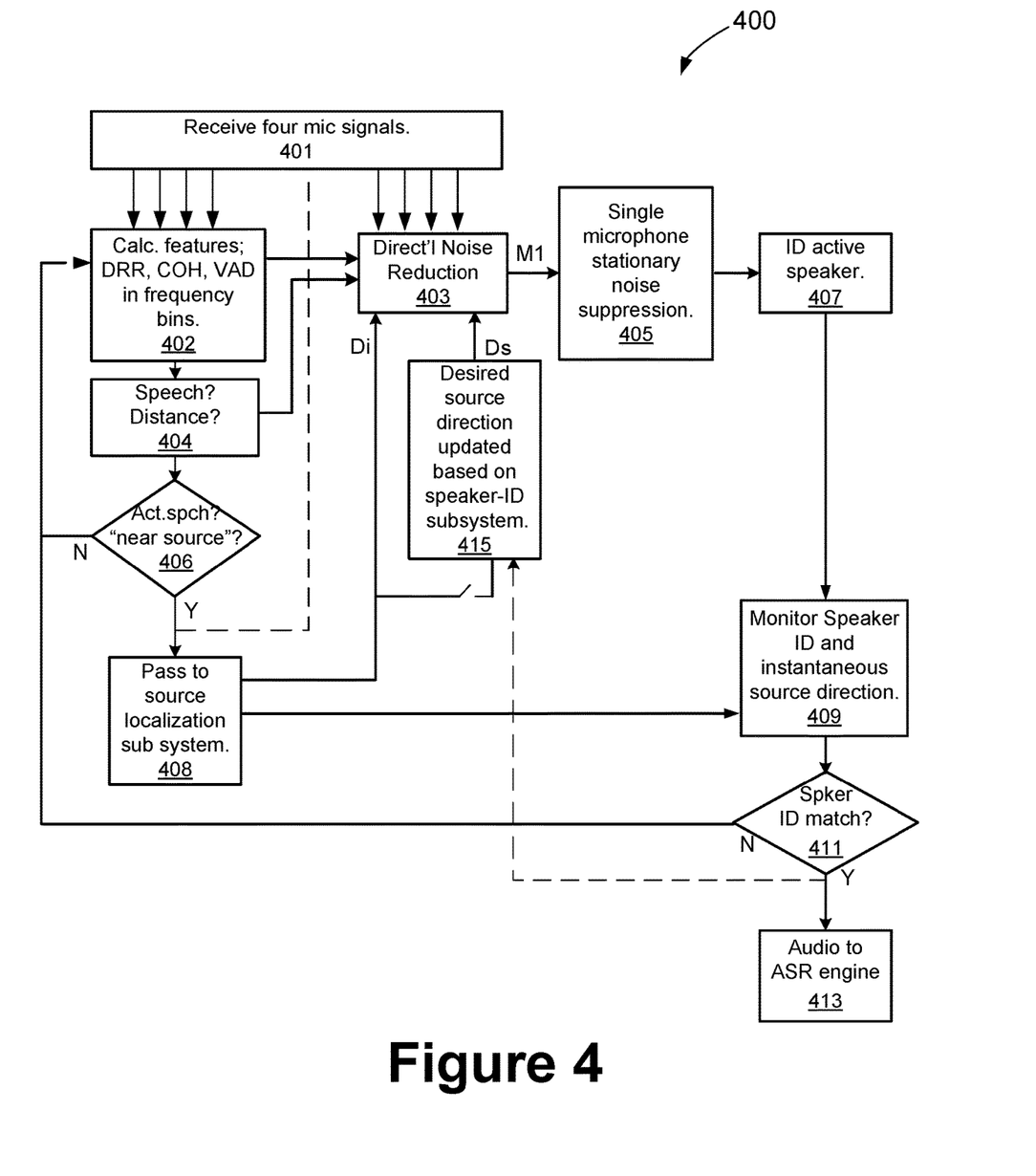
FIG. 4 is a data flow diagram showing example audio processing in accordance with an embodiment of the disclosed principles.

FIG. 4 is flowchart showing a process 400 for directional noise suppression in keeping with embodiments of the foregoing description. The process 400 begins at stage 401 wherein the device receives four (for example) microphone signals from the device microphones. The received signals are processed in two threads, one of which starts at stage 402 utilizing a plurality of microphones, proceeding through even stage numbers, and the other of which starts at stage 403 utilizing a preselected single microphone, proceeding through odd stage numbers.

Starting at stage 402, the device calculates acoustic features from the front end microphone array signals (e.g., in 10-20 ms frames). These features are computed by first converting at least two spatially separate microphone time-domain signals to the frequency-domain via the use of Fast Fourier Transform (FFT), and then computing in block 402, the direct-to-reverberant power-ratio (DRR), coherence (COH), voice activity detection (VAD). Note that computation of the above-mentioned acoustic features in 402 as stated above is executed in the frequency domain, and involves at least two spatially separated microphones. The selection of at least two microphones out of, e.g. M available microphones, depends on the microphone placement, device orientation and use case scenarios.

At stage 404, the device determines if the signals contain speech and from what distance these signals are arriving at the microphone array. At stage 406, the device determines whether the active speech source is a "near source", meaning the active speech source is within a predetermined estimated distance which is based on use case analysis of device 210. If so, the data is passed to the Source localization sub system at stage 408. Otherwise, the process 400 returns to stage 402.

From stage 408, the process 400 flows to stage 403, wherein the device executes directional noise reduction. It should be noted that the acoustic features computed in stages 402 and 404 along with localization estimates corresponding to the desired user (Ds) and interfering users (Di) obtained from block 415 is also available at stage 403 for directional noise reduction. After directional noise reduction is executed at stage 403, the process 400 flows to stage 405, wherein the device executes stationary noise suppression either on a preselected single microphone signal or on the beamformed signal.

With the directional and single mic stationary noise suppression executed, the process 400 flows to stage 407, wherein the device identifies the active speaker. Speaker ID can be performed in numerous ways, including but not limited to machine learning techniques. At stage 409 the device continues to monitor the speaker ID (from 407) and instantaneous source direction (from 408), while determining at stage 411 whether the speaker ID meets a predetermined confidence level. For example, the process may identify the speaker via voice identification but find that they are someone other than the speaker of interest.

If the speaker ID meets the predetermined confidence level, the device passes the audio to the automatic speech recognition engine for processing at stage 413. Using the prescribed flow of operations, the automatic speech recognition (ASR) engine is activated only when the desired user is active thereby improving the power efficiency of the combined system. In an embodiment, automatic speech recognition is used to identify a command in the speech of the speaker of interest and to execute the command.

Figure 5:
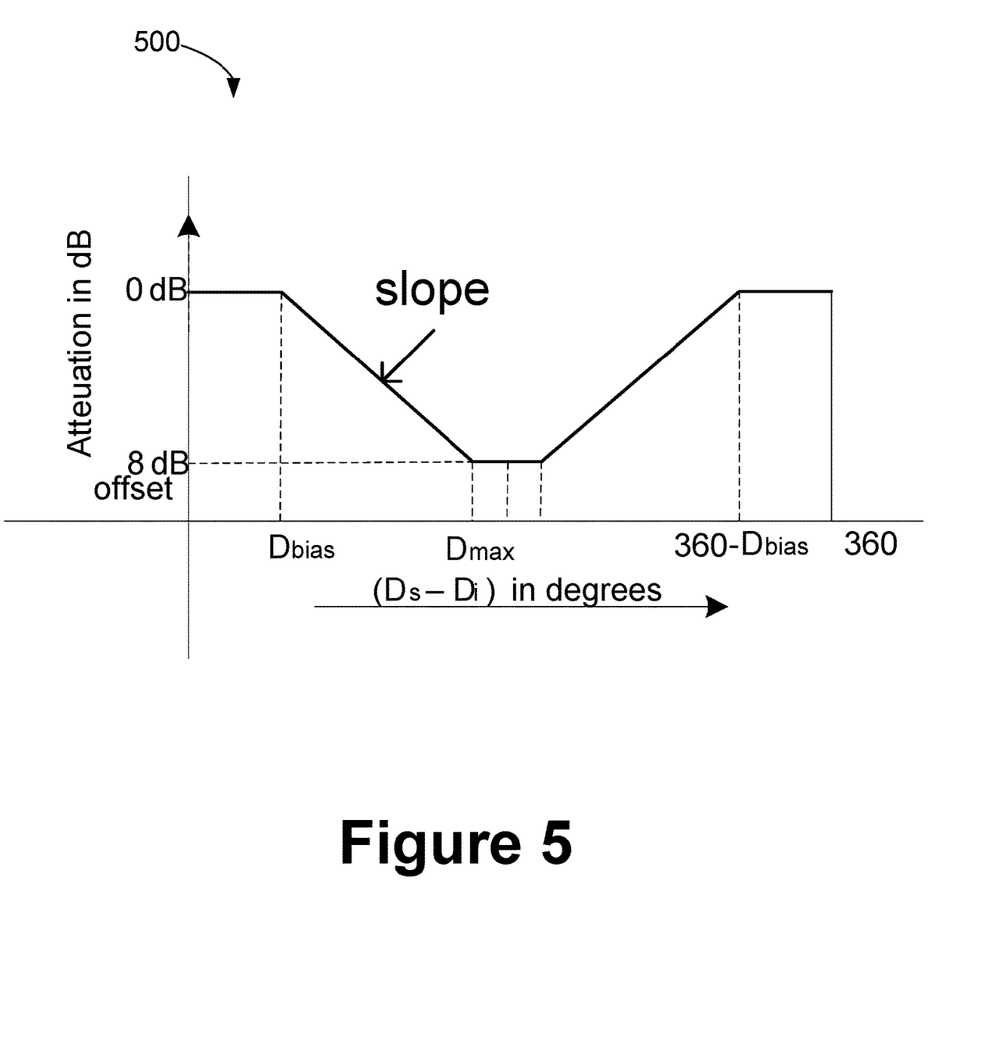
FIG. 5 is a mask plot showing a spatial attenuation mask applicable in accordance with an embodiment of the disclosed principles.

As can be seen in FIG. 5, for the spatial mask component of the DNS (403), the directional attenuation (or the spatial mask) is computed on the basis of Ds and Di, using multiple microphone signals. However, once computed, the directional attenuation is only applied to one of the preselected microphones when it is used in a standalone configuration, or alternatively on the output of the beamformer (which takes multiple microphone inputs and produces a single output). Unlike a beamformer, the described spatial mask component in the DNS block 403 has no spatial selectivity for concurrent desired user and interfering user activity.

The spatial mask can, however, block sounds coming from a certain direction while allowing sounds from other directions. Therefore when the desired user is not active DNS is able to attenuate signals coming from interfering directions. In certain applications, for example in a TV equipped with the disclosed DNS system, where it is reasonable to assume the desired user direction cannot be behind the TV, the standalone spatial mask can improve the FAs rate by rejecting sounds coming from behind the TV. However, when there is simultaneous activity from the desired source direction and an undesired source direction, the system will do little to improve the overall voice recognition performance. To improve upon this particular situation, the process 400 cascades spatial mask and traditional beamforming resulting in a two-stage DNS which will improve both FA and FR, as described next.

FIG. 5 provides an example function 500 for mapping directional information into a spatial attenuation function which in its most basic form behaves akin to a spatial mask. The spatial mask depicted in FIG. 5 is designed to accept the sound coming from the front of the device (with in a deviation of $-D_{bias}$ to $D_{bias}$), which is the direction depicted as including source 209 in FIG. 2. The x-axis is the deviation of estimated source direction ($D_i$) from the desired source direction ($D_s$) and is depicted as ($D_s$-$D_i$) in FIG. 5.

A hysteresis threshold is defined ($D_{bias}$) such that when deviation ($D_s$-$D_i$) is less than this threshold there is no attenuation applied to the microphone signal. The mask depicted applies 0 dB attenuation when the source is in front of the device, and applies a maximum attenuation of 8 dB (offset) when the deviation ($D_s$-$D_i$) exceeds $D_{max}$. The selection of offset, slope, $D_{bias}$, and $D_{max}$ is made by the system designer to accommodate the specific device. It should be noted that the attenuation function is applied only on a single microphone signal. As such, it is also referred to as a spatial mask.

The function and desirability of the spatial mask is different than traditional beamforming in terms of spatial source selectivity. This differentiation is evident when there is simultaneous activity of interfering signals along with the desired source. The mask will attenuate the signals from interfering directions when the desired direction ($D_s$) has no signal activity and let everything go through when desired source activity is detected. Therefore, the greatest utility of this spatial mask is in the case when we would like to reduce the FAs. However, the spatial mask may not have any impact on FRs that have an increased likelihood of occurrence when the desired source is active along with the interfering noise or sources.

Figure 6:
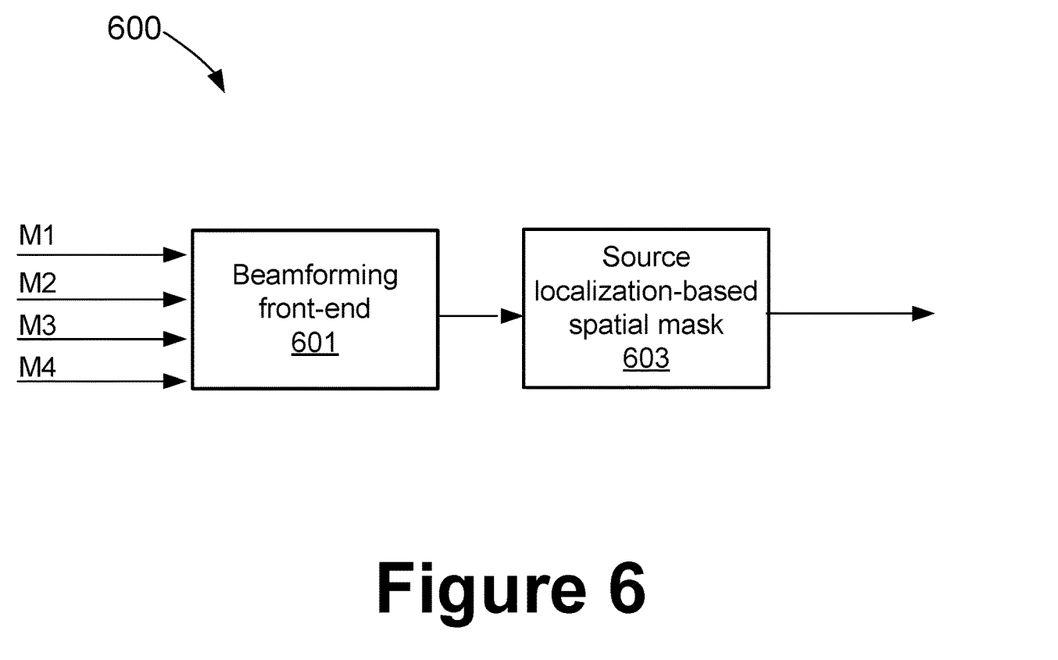
FIG. 6 is an overall flow diagram showing stages in accordance with an embodiment of the disclosed principles.

A second example configuration is shown in FIG. 6. The illustrated configuration 600 implements a microphone array beamformer 601 steered (or with fixed-lookup) in the desired direction (Ds) followed by application of the source localization based spatial mask 603. Note that due to non-ideal placement of microphones, the beamformer might not be ideal, i.e., it may have a wide main lobe, or higher side lobes, so the spatial mask is an effective way to shape the resulting beam pattern.

Figure 7:
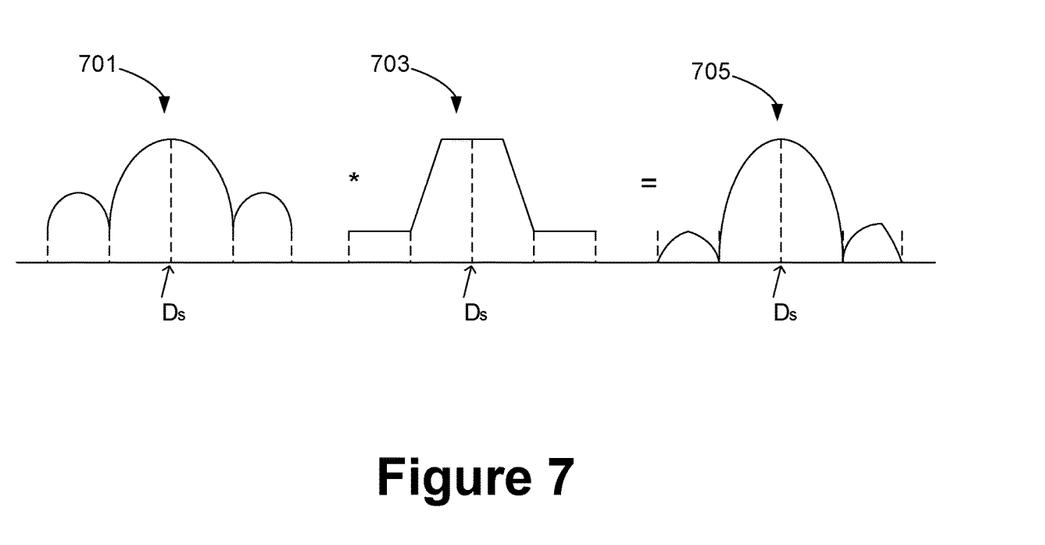
FIG. 7 is a simplified audio diagram showing a directional reception pattern, a linear spatial mask operating on the directional reception pattern, and a resultant beamformed, masked reception pattern in accordance with an embodiment of the disclosed principles.

An example of the application of the above configuration is shown in FIG. 7, wherein a linear spatial mask 703 is used to shape the already-directional beam pattern 701 of a microphone array, yielding the product pattern 705. It will be appreciated that a variety of spatial response functions can be derived to shape the beam pattern to accommodate different design constraints. The spatial mask in FIG. 5 is piece-wise linear, but even more effective spatial masks may be obtained by polynomial curve fitting if desired.

It will be appreciated that various systems and processes have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

What is claimed is:

1. An electronic device having improved directional noise suppression, the electronic device comprising:
a microphone array having a plurality of microphones; and
a processor linked to the microphone array and being configured to:
specify a direction of interest; and
generate a spatial mask reception pattern of the microphone array to focus in the direction of interest and to suppress signals from all other directions when there is no signal activity from the direction of interest while leaving all signals from all directions unsuppressed when signal activity from a desired source is received from the direction of interest.

2. The electronic device according to claim 1, wherein the spatial mask reception pattern focuses in the direction of interest and suppresses signals from all other directions only when the desired source is within a predefined distance of the electronic device.

3. The electronic device according to claim 1, wherein the processor is further configured to apply speaker/voice identification to the signal activity with directional noise suppression.

4. The electronic device according to claim 3, wherein the processor is further configured to apply automatic speech recognition to speech of a speaker of interest to identify a command.

5. The electronic device according to claim 4, wherein the processor is further configured to execute the command.

6. The electronic device according to claim 1, wherein the processor is further configured to suppress the signals from the all other directions by a maximum attenuation of 8 dB.

7. The electronic device according to claim 1, further comprising an acoustic source localization sub-system configured to distinguish between a first source and a second source interfering with the first source.

8. The electronic device of claim 1, further comprising a memory linked to the processor.

9. The electronic device of claim 1, further comprising one or more output components linked to the processor.

10. The electronic device of claim 1, further comprising a voice recognition system configured to estimate a distance and a direction-of-arrival of sound sources around the electronic device.

11. The electronic device of claim 10, the voice recognition system further configured to identify and spatially track a sound source.

12. The electronic device of claim 1, the plurality of microphones comprising four microphones.

13. The electronic device of claim 1, wherein a geometry of the plurality of microphones is linear.

14. The electronic device of claim 1, further comprising a localizer linked to the plurality of microphones and configured to process signals acquired by the plurality of microphones.

15. The electronic device of claim 1, wherein the processor is further configured to apply automatic speech recognition to speech of a speaker to identify a command.

16. The electronic device of claim 1, wherein the processor is further configured to determine a distance from the electronic device at which speech signals received by the microphone array originate.

17. The electronic device of claim 1, wherein the processor is further configured to identify a speaker by applying speaker/voice identification to audio signals received at the microphone array.

18. The electronic device of claim 1, the spatial mask reception pattern defining a linear slope between an unattenuated portion and an attenuated portion.

19. The electronic device of claim 1, further comprising a microphone array beamformer linked to the microphone array and configured to steer a beam pattern of the microphone array in the direction of interest.

20. The electronic device of claim 1, wherein the spatial mask reception pattern is piecewise linear.

* * * * *